July 29, 1952  C. C. KIRBY  2,604,920
NONTRAP STONE TREAD

Filed Jan. 3, 1950  2 SHEETS—SHEET 1

Inventor
CHARLES C. KIRBY
By Ely & Frye
Attorneys

July 29, 1952  C. C. KIRBY  2,604,920
NONTRAP STONE TREAD
Filed Jan. 3, 1950  2 SHEETS—SHEET 2

Inventor
CHARLES C. KIRBY
By Ely & Frye
Attorneys

Patented July 29, 1952

2,604,920

UNITED STATES PATENT OFFICE 2,604,920

NONTRAP STONE TREAD

Charles C. Kirby, Akron, Ohio, assignor to The Firestone Tire & Rubber Company, Akron, Ohio, a corporation of Ohio Application January 3, 1950, Serial No. 136,519

4 Claims. (Cl. 152—209)

This invention relates to improvements in treads for non-metallic tires and in particular concerns improvements in treads of pneumatic tires molded from rubber or rubber-like materials.

The treads of such tires are commonly formed with a pattern comprising up-standing ribs and/or a plurality of studs each of which pattern units presents a working surface to that of the road. The present invention is illustrated by reference to a continuous rib tire; however, it is to be understood that the invention is not to be limited to such continuous ribs, but that in their stead a series of broken ribs, or circumferentially elongated lugs, may be used without departing from the spirit of the invention. While the tread embodying the present invention has been designed with its esthetic appeal considered, its mechanical function is of primary concern.

An object of the present invention is to provide a tire having improved traction.

Another object of the invention is to provide an effecive non-skid tread in which tread wear is less than in treads heretofore known which provide comparable traction.

A more specific object of the invention is to provide a tread having grooves between non-skid tread elements, the tread being so constructed as to prevent stones from lodging in the grooves.

Heretofore the problem of preventing the lodgement of hard objects and particularly stones in tire tread grooves has been a serious problem which tire engineers have diligently but unsuccessfully sought to solve.

A hard object, such as a stone, wedged into and lodged in a tread groove gauges and chafes the adjoining tread rubber thereby wearing a permanent recess or hole therein which hole, if the stone or the like is not dislodged, will often extend entirely through the tread rubber to and into the tire fabric. Such deeply worn holes expose the tire to the deteriorative effect of moisture and sand and localize the strain of tire flexture which frequently results in separation of the components of the tire.

The present invention provides a tire tread construction having greatly improved stone-ejecting efficiency. To provide this improvement applicant has utilized the theory of frictional repose. In the illustration of the invention it is considered that when an object exerts a force at an acute angle to a surface, there is a critical position when the components along the surface are equal to the frictional force created by the normal component. This is the "angle of repose" and its tangent equals the coefficient of friction of the surfaces in contact. This coefficient of friction varies somewhat with loading being greater for increased contact pressure.

When a stone is pressed into a tread groove, the lateral reaction of the side of the rib against the stone sets up a frictional (holding) force, and an outward force along the rib surface. The present invention provides a tire tread rib having groove sides that slope away from the radial plane at an angle equal to or greater than the repose angle, and accordingly the ejection component overcomes the holding component and the stone is readily released from the groove.

Although the theory of frictional repose has been well known to tire engineers, no one, before the present invention, conceived the idea of making use of this theory in tires designed to overcome or improve stone-ejection from tread grooves. While the angle of repose will vary according to the surfaces involved, applicant has discovered that efficient and satisfactory stone-ejection occurs by grooved tire treads when the stone contact surface of the sides of a groove is so sloped as to be at the angle of repose determined by the coefficient of friction between smooth stone and tread rubber.

Tire engineers are confronted with a standard of a fixed depth of tread grooves for tires of given sizes established by The Tire and Rim Association, also the requirement of providing sufficient volume of tread rubber in the road contact area of the tire to provide the desired tread life or wear.

Another phase of tread design, which must be taken into account relative to the problem of stone-ejection, is the maximum width of tread groove allowable and still having sufficient volume of rubber in the ribs of a tire tread of a given over-all width to provide lateral stability to said ribs. Tread ribs which do not have lateral stability wear away rapidly.

Still another limitation which confronts tire designers is the necessity of maintaining the bottom of the tread groove width sufficient to prevent localized flexing, which flexing resulted in tread cracking.

Referring to the drawing.

Figure 1:
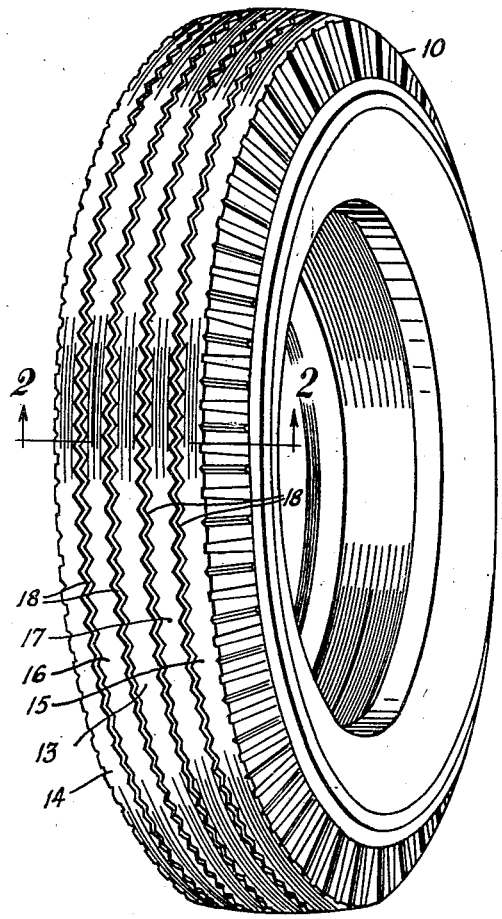
Fig. 1 is a perspective view of a pneumatic tire embodying the invention.

Referring to the drawing in detail there is shown a tire casing 10 having a body portion 11 and a tread portion 12. The tread comprises a a center rib 13, shoulder ribs 14 and 15, and intermediate ribs 16 and 17, there being circumferential grooves 18 between adjacent ribs. Both lateral faces of each rib are formed with continuous serrations comprising contiguous wedge-shape teeth and intermediate notches thus presenting a saw-toothed formation along the edges of the ribs. While the present invention is illustrated in relation to a tire tread of a saw-toothed formation as shown, it is to be understood that it is not limited to such treads as the invention is useful in any grooved tread construction.

Figure 4:
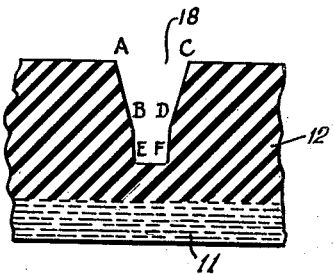
Figure 4 is a fragmentary sectional view taken on line 4—4 of Fig. 3 and drawn to larger scale.
Figure 5:
Figure 5 is a view similar to Fig. 4 showing the tread adjacent a groove in contact with the ground and with a stone forced into the groove.
Figure 2:
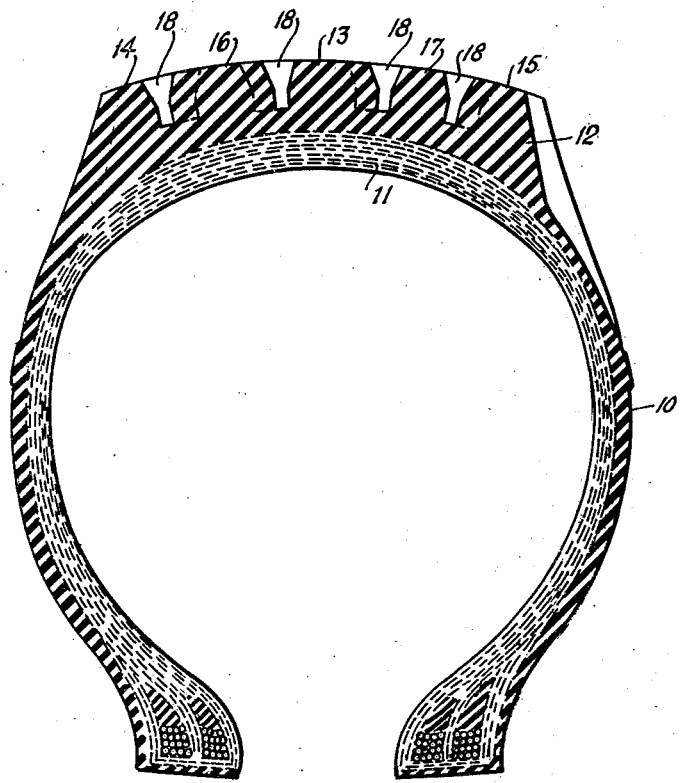
Figure 2 is a sectional view taken on line 2—2 of Fig. 1.
Figure 3:
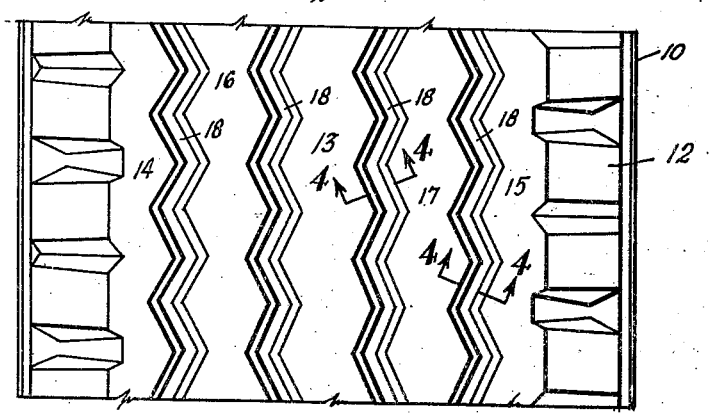
Figure 3 is a fragmentary plan view of the tread of the tire shown in Fig. 1.

Considering now the grooves 18 and having particular reference to Fig. 4 it will be seen that said grooves have sides that extend in a converging direction radially inwardly a first distance from A to B and C to D, and then a further distance B to E and D to F at the bottom of said groove. The slope of side portions AB and CD is at a 15° angle to a line parallel to the tread radius that passes through the center of the groove defined by said sides and similarly the slope of portions BE and DF is 6° to the tread radius referred to above.

It has been found that said 15° slope of the sides of the groove is the approximate angle of repose determined by the coefficient of friction between smooth stone and tread rubber and that 10° is the smallest angle which will resist clogging to an extent which prevents tire failures from stones lodging in tread grooves.

Also that if grooves having sides with a 15° slope are provided and these slopes begin at the tread road-contact surface and extend approximately two-thirds the distance from the surface to the bottom of the grooves that in a tire, such as 10, there will be provided a desirable area of tread road-contact surface. Further that from the opening of the groove to the point of termination of the 15° slope will be a distance such that stones of a size to enter the groove will not be large enough to be forced into the bottom one-third of the grooves where the sides have a 6° slope and no efficient stone-ejection characteristic. A groove of the relative dimensions described will not trap small stones since the total depth of the groove is such that a stone of a size that will enter the lower third of the groove is too small to be forced deep enough into the groove to reach the said bottom portion, at least until considerable tread rubber has been worn away.

It will now be seen that the gist of the present invention resides in the provision of a tire tread having grooves which comply with the industry standard as to depth, which grooves have sufficient width at their bottoms to prevent tread cracking and having sides at the radial outer portion of the grooves at an angle equal to or greater than the repose angle whereby lodgement of stones in the grooves is substantially prevented, while a laterally stable tire tread having desirable tractive qualities is provided. To provide a tire tread which would meet the requirements just enumerated, applicant conceived a tire groove having the slope of its radial outer sides greater than the repose angle while the radial inner one-third of the groove has sides with a slope less than the repose angle.

The invention has been illustrated in reference to a five-rib tread tire, but the invention is not to be limited to such a tire as any number of ribs found satisfactory may be used. Other changes and modifications will occur to those familiar with the art; therefore, the invention is to be limited only by the scope of the following claims and the prior art.

What is claimed is:

1. A pneumatic tire construction comprising a tread portion formed with a plurality of endless circumferential ribs defining intervening circumferential grooves, the lateral faces of said ribs being continuously serrated and sloping a first distance radially inwardly approximately two-thirds the depth of the grooves, in a converging direction, at an angle not less than the angle of repose determined by the coefficient of friction between smooth stone and tread rubber, said faces of each of said grooves extending a second distance to the bottom of said grooves at an angle to a line parallel to the tread radius that passes through the center of said grooves, of less than said angle of repose.

2. A pneumatic tire construction comprising a tread portion formed with a plurality of circumferential ribs defining intervening grooves, the lateral faces of said ribs being continuously serrated and sloping radially inwardly approximately two-thirds the depth of the grooves, in a converging direction, at an angle not less than the angle of repose determined by the coefficient of friction between smooth stone and tread rubber, said faces of each of said grooves extending a further distance to the bottom of said grooves at an angle to a line parallel to the tread radius that passes through the center of the grooves of less than said angle of repose.

3. A pneumatic tire construction comprising a tread portion formed with a plurality of endless circumferential ribs defining intervening grooves, the lateral faces of said ribs being continuously serrated and sloping radially inwardly approximately two-thirds the depth of the grooves in a converging direction not less than a 15° angle to a line parallel to the tread radius that passes through said grooves, said faces extending a further distance to the bottom of said grooves at an angle to said line of approximately 6°.

4. A pneumatic tire construction comprising a tread portion formed with a plurality of circumferential ribs defining intervening circumferential grooves having, in cross-section, converging sides from the radial outer portion of the grooves toward the bottom of the grooves, said converging sides extending a first distance from said outer portion to a point approximately two-thirds the depth of the grooves at an angle to a line parallel to the tread radius that passes through the center of a groove defined by said ribs, and then a second distance to the bottom of said grooves at an angle to said line, said latter angle being less than the former.

CHARLES C. KIRBY.

REFERENCES CITED

The following references are of record in the file of this patent:

UNITED STATES PATENTS

| Number | Name | Date |
|---|---|---|
| 1,475,094 | Tuttle | Nov. 20, 1923 |

FOREIGN PATENTS

| Number | Country | Date |
|---|---|---|
| 459,835 | Great Britain | Jan. 15, 1937 |
| 838,705 | France | Apr. 11, 1939 |